United States Patent
Govari

(10) Patent No.: US 12,551,272 B2
(45) Date of Patent: Feb. 17, 2026

(54) PRECISE IRRIGATION RATE FOR ABLATION CATHETER

(71) Applicant: BIOSENSE WEBSTER (ISRAEL) LTD., Yokneam (IL)

(72) Inventor: Assaf Govari, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 529 days.

(21) Appl. No.: 18/088,858

(22) Filed: Dec. 27, 2022

(65) Prior Publication Data
US 2024/0206961 A1  Jun. 27, 2024

(51) Int. Cl.
*A61B 18/14* (2006.01)
*A61B 18/00* (2006.01)

(52) U.S. Cl.
CPC .............. *A61B 18/1492* (2013.01); *A61B 2018/00577* (2013.01); *A61B 2218/003* (2013.01)

(58) Field of Classification Search
CPC ...... A61B 18/1492; A61B 2018/00577; A61B 2018/00005; A61B 2018/00011; A61B 2018/00351; A61B 2218/001; A61B 2218/002; A61B 2218/003; A61M 1/72
USPC .......................................................... 606/34
See application file for complete search history.

(56) References Cited

U.S. PATENT DOCUMENTS

| | | | |
|---|---|---|---|
| 4,964,864 A | 10/1990 | Summers | |
| 5,391,199 A | 2/1995 | Ben-Haim | |
| 5,443,489 A | 8/1995 | Ben-Haim | |
| 5,558,091 A | 9/1996 | Acker et al. | |
| 6,172,499 B1 | 1/2001 | Ashe | |
| 6,239,724 B1 | 5/2001 | Doron et al. | |
| 6,332,089 B1 | 12/2001 | Acker et al. | |
| 6,484,118 B1 | 11/2002 | Govari | |
| 6,618,612 B1 | 9/2003 | Acker et al. | |
| 6,690,963 B2 | 2/2004 | Ben-Haim et al. | |
| 6,788,967 B2 | 9/2004 | Ben-Haim et al. | |
| 6,892,091 B1 | 5/2005 | Ben-Haim et al. | |
| 7,536,218 B2 | 5/2009 | Govari et al. | |
| 7,756,576 B2 | 7/2010 | Levin | |

(Continued)

FOREIGN PATENT DOCUMENTS

| | | | |
|---|---|---|---|
| EP | 2180186 A1 | 4/2010 | |
| WO | WO-02056805 A2 * | 7/2002 | ......... A61F 9/00802 |
| WO | 2021001742 A1 | 1/2021 | |

OTHER PUBLICATIONS

European Search Report for corresponding EPA No. 23219880.4 dated Jun. 5, 2024.

*Primary Examiner* — Beverly M Flanagan

(57) ABSTRACT

In one exemplary mode, a system includes a progressive cavity pump (PCP) comprising a housing, a rotor, a stator, and ports, one port being configured to be connected to an irrigation reservoir, an ablation catheter comprising at least one ablation electrode, at least one irrigation hole, and an irrigation channel having a distal end connected to the irrigation hole(s), and a proximal end configured to be connected to another port of the PCP, a motor comprising a drive shaft which is configured to be connected to the PCP, and drive rotation of, the rotor of the progressive cavity pump, and a controller configured to control a rotatory speed of the motor to control a flow rate of the PCP so as to pump irrigation fluid from the irrigation reservoir into the irrigation channel and out of the irrigation hole(s) of the ablation catheter.

13 Claims, 5 Drawing Sheets

(56) References Cited

U.S. PATENT DOCUMENTS

| | | | |
|---|---|---|---|
| 7,848,787 B2 | 12/2010 | Osadchy | |
| 7,869,865 B2 | 1/2011 | Govari et al. | |
| 8,043,075 B2 | 10/2011 | Mack | |
| 8,456,182 B2 | 6/2013 | Bar-Tal et al. | |
| 9,445,725 B2 | 9/2016 | Govari et al. | |
| 9,603,990 B2 * | 3/2017 | Woolford | F04B 43/0072 |
| 9,616,199 B2 | 4/2017 | Wang | |
| 10,912,607 B2 | 2/2021 | Wang | |
| 2017/0095643 A1 | 4/2017 | Flanagan | |
| 2020/0206410 A1 * | 7/2020 | Algawi | F04B 49/20 |
| 2021/0038299 A1 | 2/2021 | Bachman | |
| 2022/0241487 A1 * | 8/2022 | Sussman | A61M 1/80 |
| 2022/0296868 A1 | 9/2022 | Imran et al. | |
| 2022/0362452 A1 | 11/2022 | Algawi et al. | |
| 2023/0028279 A1 * | 1/2023 | Govari | A61M 1/71 |
| 2024/0139028 A1 * | 5/2024 | Shechtman | A61F 9/00745 |

* cited by examiner

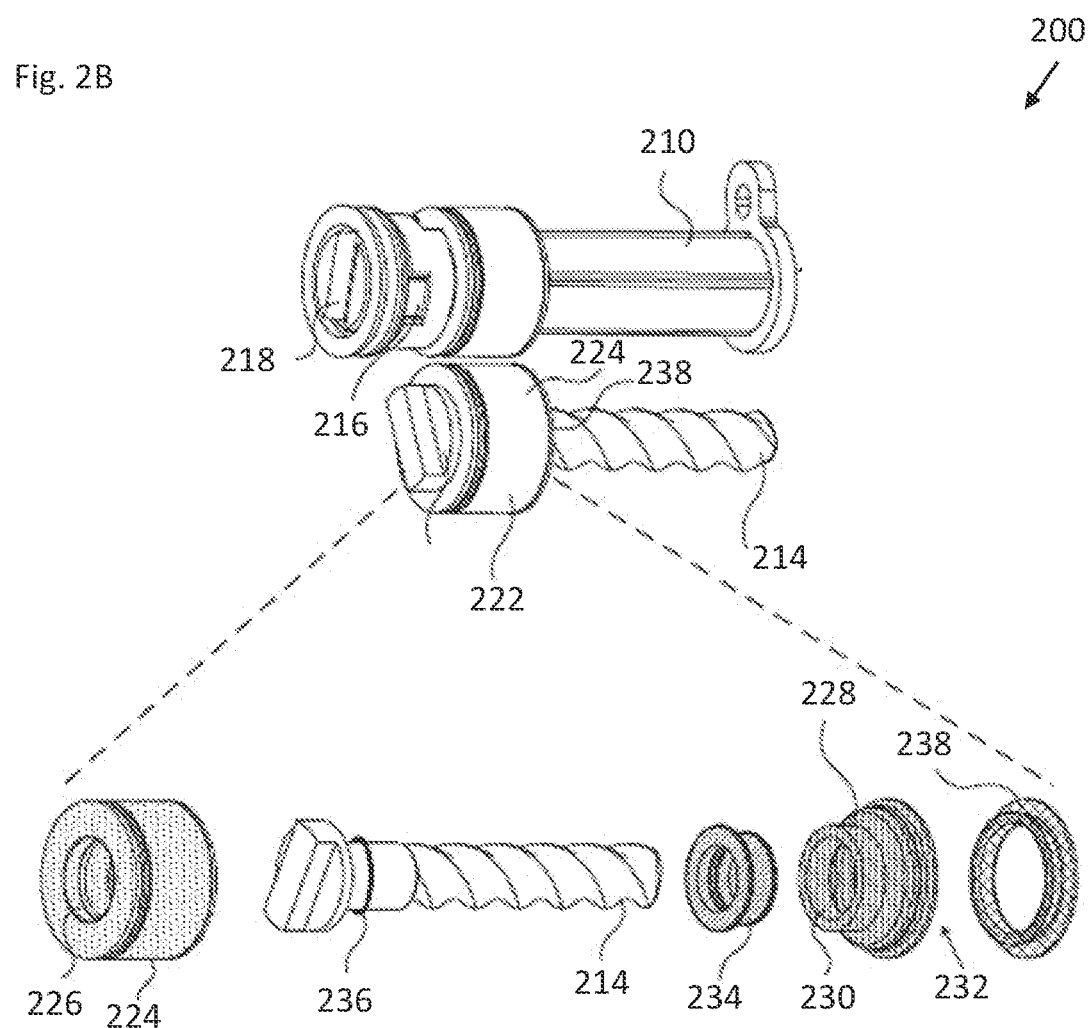

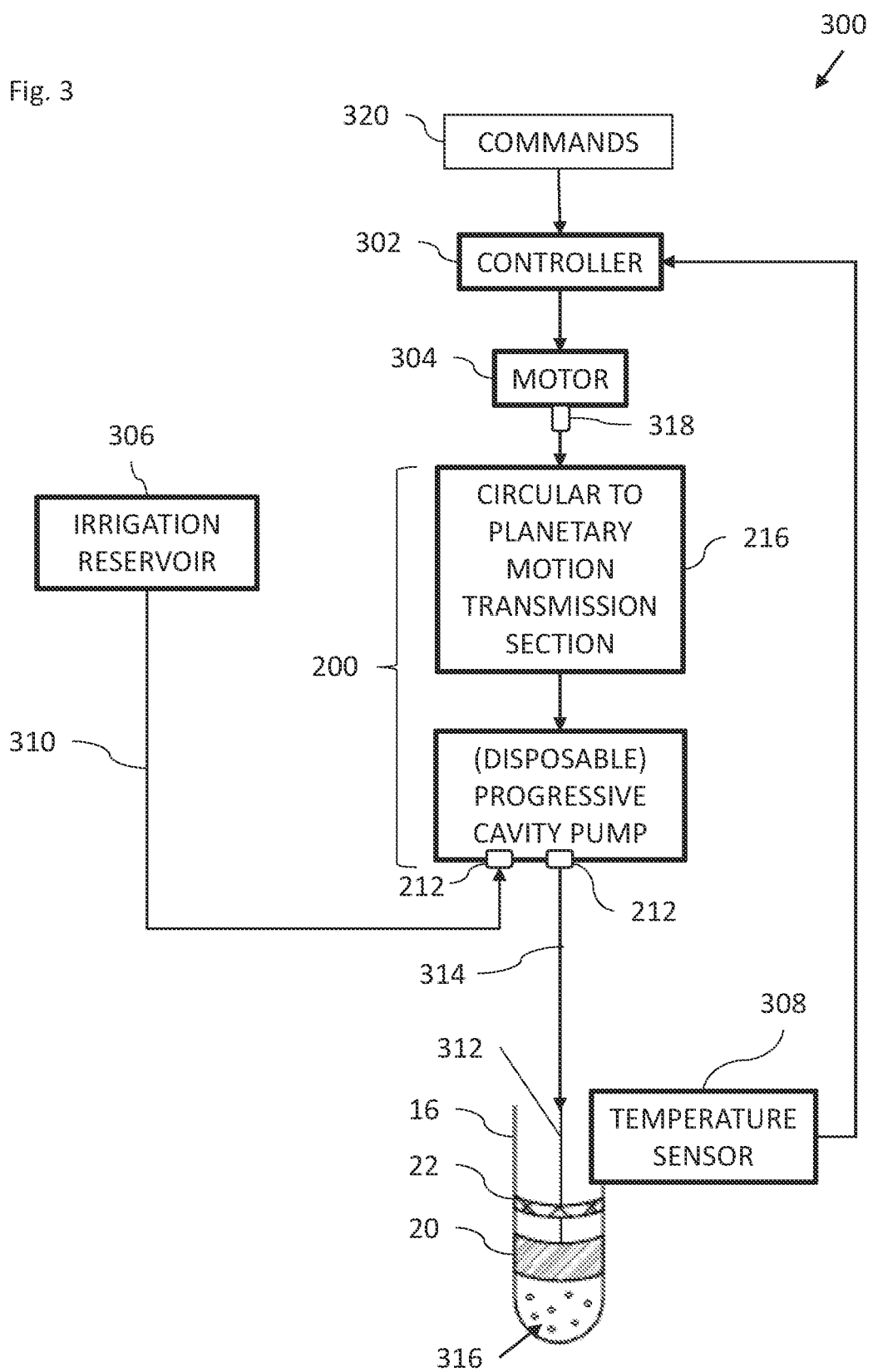

PRECISE IRRIGATION RATE FOR ABLATION CATHETER

FIELD OF THE DISCLOSURE

The present disclosure relates to medical systems, and in particular, but not exclusively, to irrigation in ablation systems.

BACKGROUND

A wide range of medical procedures involve placing probes, such as catheters, within a patient's body. One medical procedure in which these types of probes or catheters have proved extremely useful is in the treatment of cardiac arrhythmias. Cardiac arrhythmias and atrial fibrillation in particular, persist as common and dangerous medical ailments, especially in the aging population.

Diagnosis and treatment of cardiac arrhythmias include mapping the electrical properties of heart tissue, especially the endocardium and the heart volume, and selectively ablating cardiac tissue by application of energy. Catheters are inserted into the heart chamber and optionally around the heart chamber during such procedures. In most procedures, multiple catheters are inserted into the patient. Catheters may include mapping, ablation, temperature sensing and image sensing catheters. Some catheters are dedicated for placement in specific parts of the anatomy, e.g., coronary sinus, esophagus, atrium, ventricle. The catheters have multiple electrical channels, some more than others depending on the number of sensors and electrodes included in each catheter. The number and type of catheters depends on the procedure and on the physician preferred workflow.

BRIEF DESCRIPTION OF THE DRAWINGS

The present disclosure will be understood from the following detailed description, taken in conjunction with the drawings in which:

FIGS. 2A-2C are schematic illustrations of a progressive cavity pump for use in the system of FIG. 1; and FIG. 3 is a block diagram view of an irrigation sub-system in the system of FIG. 1.

DESCRIPTION OF EXAMPLES

Overview

Figure 1:
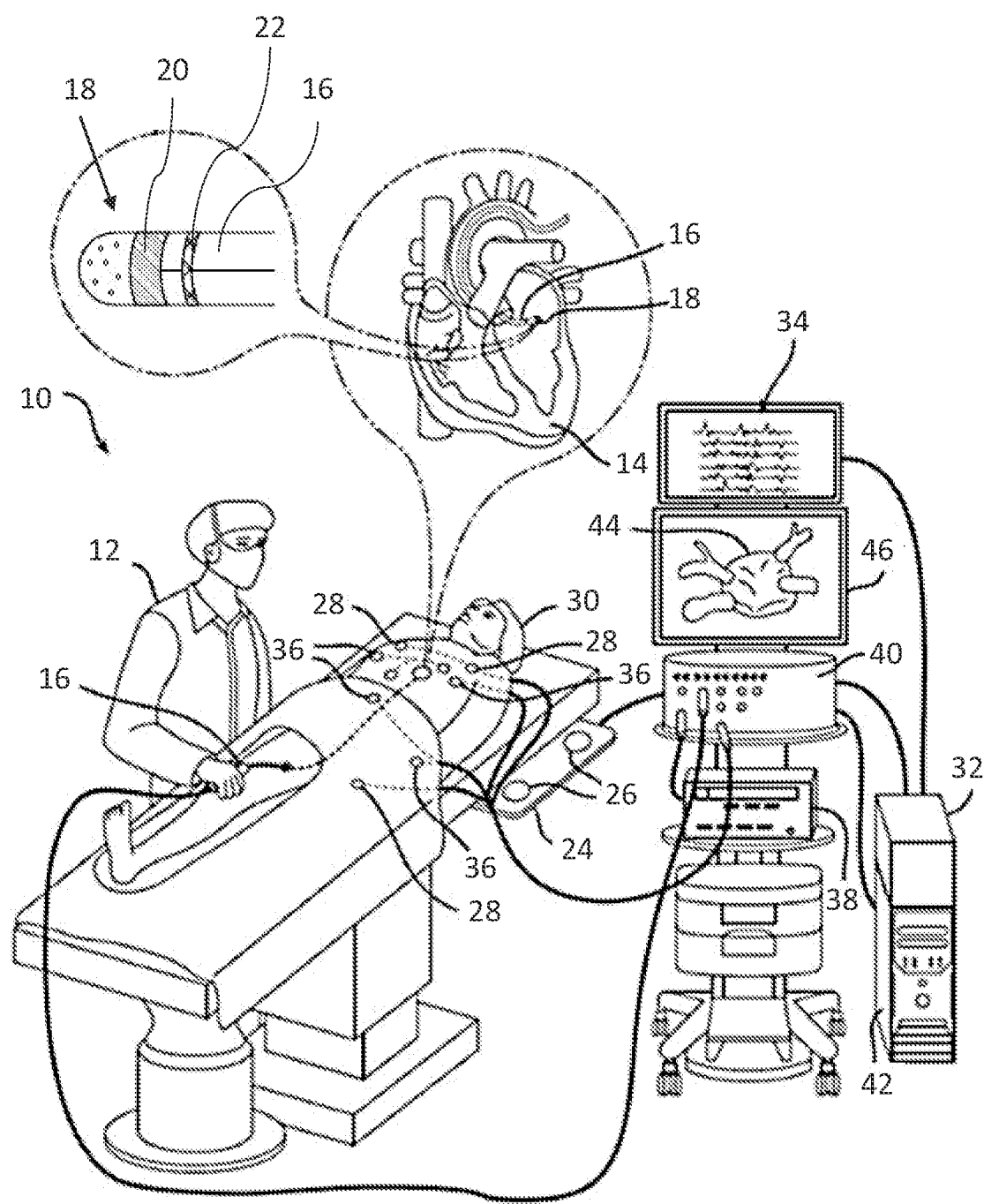
FIG. 1 is a pictorial view of a catheter-based electrophysiology mapping and ablation system constructed and operative in accordance with an exemplary mode of the present disclosure.

During an ablation procedure the ablative power injected into cells needs to be well regulated, since if too little ablative energy is absorbed by the cells they may only partly inactivate, while if too much ablative energy is absorbed it may cause excessive injury to the heart, which can be life-threatening. Another consideration for the power injected is the overall time for any given ablation procedure. Physicians typically prefer to keep the time to a minimum, so that in order to inject sufficient energy, the power injected during this time should be high. Thus, a goal for ablative power delivery is that the power level should be as close as possible to a target power, subject to not causing excessive trauma.

Tissue irrigation is necessary during ablation of the myocardium, to prevent problems such as tissue charring, or cavitation (referred to as "steam-pops") occurring during the ablation. Therefore, in addition to the goal of the power level being as close as possible to a target power, the temperature of the myocardium tissue should remain as close as possible to a target temperature. A more stable temperature and power generally leads to better ablation results and a higher quality lesion.

Irrigation is generally implemented using a peristaltic pump to pump irrigation fluid from an irrigation reservoir through a catheter to the ablation site in order to cool the ablation site. However, the irrigation fluid flow rate provided by the peristaltic pump may not be steady and continuous due to the nature of the pump and tube characteristics and therefore it is difficult to accurately control the temperature of the ablation site. It is important that the irrigation fluid flow rate is steady and continuous to maintain the ablation site at the target temperature and to avoid the problems described above.

Therefore, some exemplary modes of the present disclosure include pumping irrigation fluid from an irrigation reservoir through a catheter to an ablation site using a progressive cavity pump (PCP). The PCP may include a housing, a rotor, a stator, and a pair of ports. The pair of ports include a fluid inlet port for receiving irrigation fluid from the reservoir into the PCP and an outlet port through which irrigation fluid is expelled from the PCP and directed to the catheter irrigation tubing. The rotor is placed in the stator within the housing. One of the ports is connected to the irrigation reservoir, for example, via suitable tubing, and one of the ports is connected to the catheter, for example, via suitable tubing. The catheter includes an irrigation channel through which the irrigation fluid is pumped. The irrigation channel extends from a proximal end of the catheter to the distal end of the catheter. The distal end includes one or more irrigation holes through which the irrigation fluid exits in order to cool tissue at the ablation site.

The PCP may be operated to accurately control the irrigation fluid flow rate and provide a continuous and smooth flow. The term "continuous", as used in the specification and claims, is defined as the flow not stopping, or not dropping below a minimum flow rate (e.g., 0.5 milliliters (ml) per minute) during the time period over which the pump is actively pumping. The term "smooth", as used in the specification and claims, is defined as the flow rate not varying by more than 10% and optionally below 3% or 1%-3% from the flow rate at which the PCP is set to. For example, if the PCP is set to pump at 1 ml per minute, the flow rate does not drop below 0.9 ml per minute and does not increase above 1.1 ml per minute.

The flow rate provided by the PCP is a function of the revolution rate of the PCP rotor and therefore, the PCP may be calibrated so as to adjust the revolution rate of the PCP rotor to provide the desired flow rate of the irrigation fluid. In many applications, it is desired for the flow rate to be in the range of 1-2 ml per minute. The revolution rate of the PCP rotor may be controlled using a motor, e.g., a servo-motor, driven by a suitable controller which controls the revolution rate of the motor and therefore the revolution rate of the PCP rotor.

The flow rate provided by the PCP may be a function of the temperature measured at the ablation site so that the flow rate provided by the PCP is increased when the temperature at the ablation site increases and vice-versa.

In addition to providing accurate control over the flow rate, and providing a continuous and smooth flow, the PCP does not need special tubing as needed with peristaltic pumps. Additionally, the PCP avoids the noise created by peristaltic pumps related to release of charges from plastic due to pressure applied on peristaltic pump tubing.

In some exemplary modes, the PCP may be formed as a disposable cartridge which is connected to the motor and the irrigation tubing. After use, the PCP cartridge may be disconnected from the tubing and the motor, and then discarded. The motor may be reusable. The PCP may be formed from any suitable materials, for example, plastic, such as molded plastic. Although dimensions of a plastic PCP may have high tolerances, the PCP may be calibrated to define the linear relationship between revolutions per minute (RPM) of the rotor and flow rate.

In some exemplary modes, both ports of the PCP are located on the same side of the PCP to enable easier connection and disconnection of the irrigation tubing.

The rotor typically rotates in the stator with planetary motion. Therefore, the PCP may include a transmission section which connects to a drive shaft of the motor and the rotor of the PCP to translate circular motion provided by the motor to planetary motion to drive planetary motion of the rotor in the stator. The transmission section may be provided using a universal joint, such as an Oldham coupling.

System Description

Reference is made to FIG. 1, which is a pictorial view of a catheter-based electrophysiology mapping and ablation system 10 constructed and operative in accordance with an exemplary mode of the present disclosure. System 10 includes multiple catheters, which are percutaneously inserted by a physician 12 through the patient's vascular system into a chamber or vascular structure of a heart 14. Typically, a delivery sheath catheter is inserted into the left or right atrium near a desired location in heart 14. Thereafter, one or more catheters may be inserted into the delivery sheath catheter so as to arrive at the desired location in heart 14. The plurality of catheters may include catheters dedicated for sensing Intracardiac Electrogram (IEGM) signals, catheters dedicated for ablating and/or catheters dedicated for both sensing and ablating. An example catheter 16 that is configured for sensing IEGMs and/or performing ablation is illustrated herein. Physician 12 may place a distal tip 18 of catheter 16 in contact with the heart wall for sensing a target site in heart 14. For ablation, physician 12 may similarly place the distal tip 18 of the catheter 16 (or any suitable catheter) in contact with a target site for ablating tissue.

Catheter 16 is an exemplary catheter that includes one or more electrodes 20 (at least one of which is an ablation electrode) optionally distributed over the distal tip 18 and configured to sense the IEGM signals. Catheter 16 may additionally include a position sensor 22 embedded in or near distal tip 18 for tracking position and orientation of distal tip 18. Position sensor 22 may be a magnetic based position sensor including three magnetic coils for sensing three-dimensional (3D) position and orientation (including roll).

Magnetic based position sensor 22 may be operated together with a location pad 24 including a plurality of magnetic coils 26 configured to generate magnetic fields in a predefined working volume. Real time position of distal tip 18 of catheter 16 may be tracked based on magnetic fields generated with location pad 24 and sensed by magnetic based position sensor 22. Details of the magnetic based position sensing technology are described in U.S. Pat. Nos. 5,5391,199; 5,443,489; 5,558,091; 6,172,499; 6,239,724; 6,332,089; 6,484,118; 6,618,612; 6,690,963; 6,788,967; 6,892,091.

System 10 includes one or more electrode (body surface) patches 28 positioned for skin contact on a patient 30 to establish location reference for location pad 24 as well as impedance-based tracking of electrode(s) 20. For impedance-based tracking, electrical current is directed to electrode(s) 20 and sensed at electrode body surface patches 28 so that the location of each electrode can be triangulated (or otherwise computed) via the electrode patches 28. Details of the impedance-based location tracking technology are described in U.S. Pat. Nos. 7,536,218; 7,756,576; 7,848,787; 7,869,865; and 8,456,182.

A recorder 32 records and displays electrograms 34 captured with body surface ECG electrodes 36 and intracardiac electrograms (IEGM) captured with electrode(s) 20 of catheter 16. Recorder 32 may include pacing capability for pacing the heart rhythm and/or may be electrically connected to a standalone pacer.

System 10 may include an ablation energy generator 38 that is adapted to conduct ablative energy to the electrode(s) 20 at the distal tip 18 of the catheter 16 configured for ablating. Energy produced by ablation energy generator 38 may include, but is not limited to, radiofrequency (RF) energy or pulsed-field ablation (PFA) energy, including monopolar or bipolar high-voltage DC pulses as may be used to effect irreversible electroporation (IRE), or combinations thereof.

Patient interface unit (PIU) 40 is an interface configured to establish electrical communication between catheters, other electrophysiological equipment, power supply and a workstation 42 for controlling operation of system 10. Electrophysiological equipment of system 10 may include for example, multiple catheters, location pad 24, body surface ECG electrodes 36, electrode patches 28, ablation energy generator 38, and recorder 32. Optionally and preferably, PIU 40 additionally includes processing capability for implementing real-time computations of location of the catheters and for performing ECG calculations.

Workstation 42 includes memory, processor unit with memory or storage with appropriate operating software stored therein, and user interface capability. Workstation 42 may provide multiple functions, optionally including (1) modeling the endocardial anatomy in three-dimensions (3D) and rendering a model or anatomical map 44 for display on a display device 46, (2) displaying on display device 46 activation sequences (or other data) compiled from recorded electrograms 34 in representative visual indicia or imagery superimposed on the rendered anatomical map 44, (3) displaying real-time location and orientation of multiple catheters within the heart chamber, and (4) displaying on display device 46 sites of interest such as places where ablation energy has been applied. One commercial product embodying elements of the system 10 is available as the CARTO™3 System, available from Biosense Webster, Inc., 31A Technology Drive, Irvine, CA 92618.

Figure 2A:
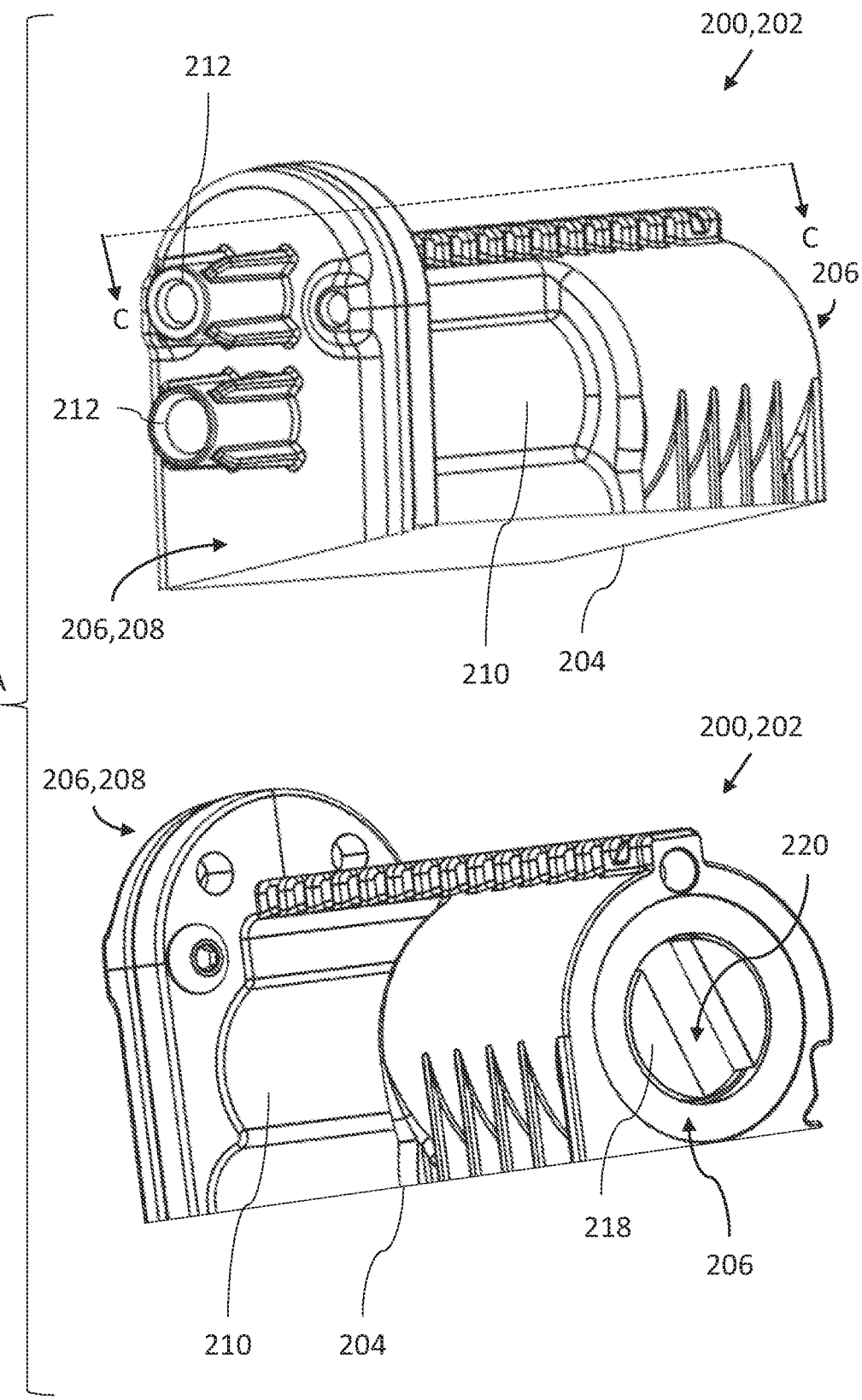
Figure 2C:
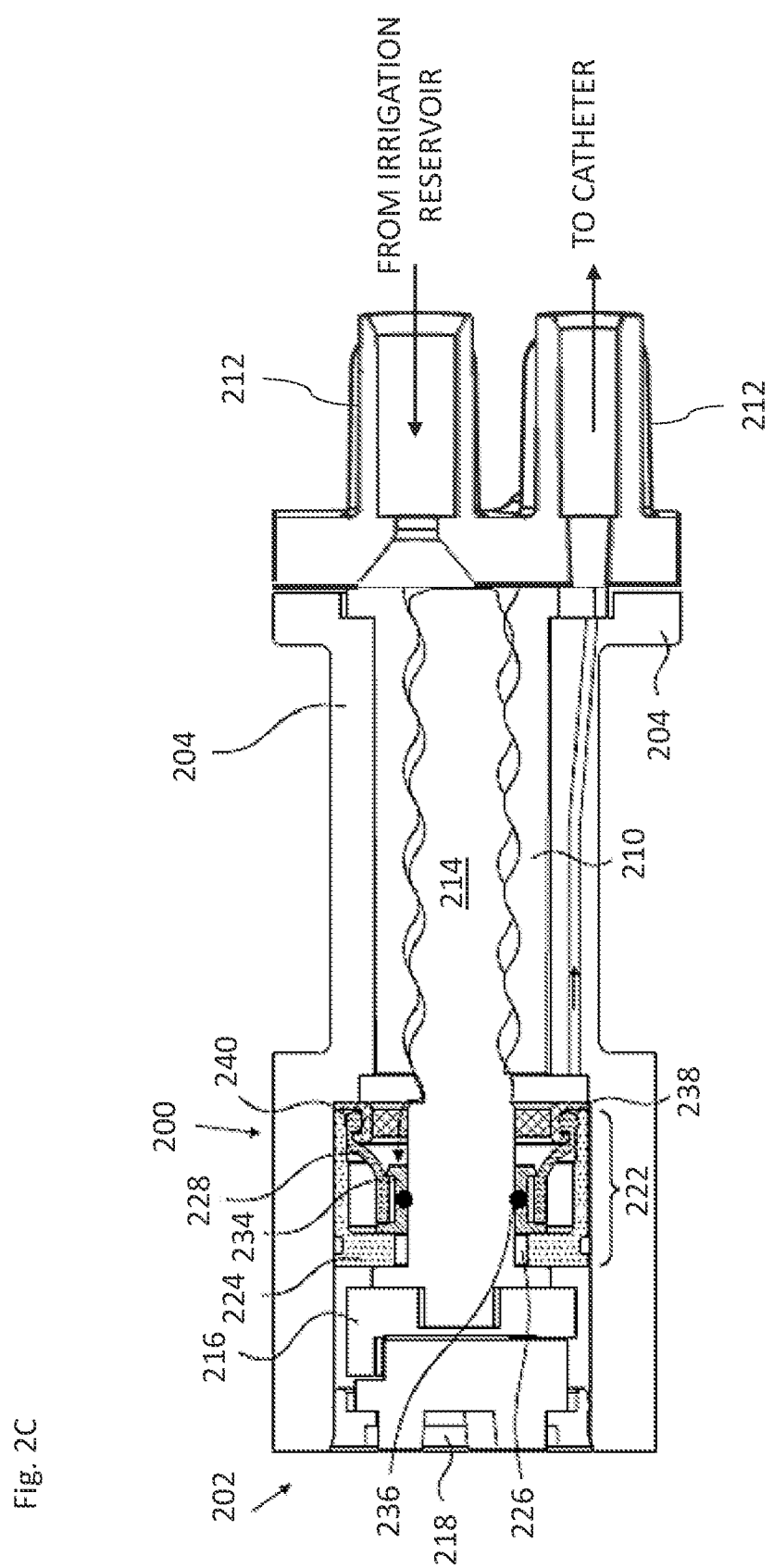

Reference is now made to FIGS. 2A-2C, which are schematic illustrations of a progressive cavity pump (PCP) 200 for use in the system 10 of FIG. 1. The progressive cavity pump 200 is used to pump irrigation fluid from an irrigation reservoir through an irrigation channel of an ablation catheter, such as the catheter 16, to provide irrigation fluid at an ablation site to cool tissue at the ablation site, as described in more detail with reference to FIG. 3.

The progressive cavity pump 200 may be formed as a cartridge 202, such as a disposable cartridge, which is connected to a motor (shown in FIG. 3) for use during an ablation procedure. After use, the cartridge 202 is typically separated from the motor, and the cartridge 202 is disposed of, while the motor is retained for future procedures.

A more detailed description of the progressive cavity pump 200 is provided with reference to FIG. 2A, which schematically shows the progressive cavity pump 200 from two different perspectives, and with reference to FIG. 2B and FIG. 2C. FIG. 2B shows internal elements of the progressive cavity pump 200, with some of the internal elements being shown in a partially exploded form. FIG. 2C is a longitudinal cross-sectional view of the progressive cavity pump 200 through line C:C of FIG. 2A.

As illustrated in FIG. 2A, the progressive cavity pump 200 comprises a cartridge housing 204 having two ends 206, one of the ends being a frontal section 208. Housing 204 is shaped to define and retain a stator 210 and the frontal section 208 comprises a pair of ports 212 which are in fluidic communication with the stator 210. Having the ports 212 disposed in the same end of the PCP 200 allows for easier connection of irrigation tubing from the irrigation reservoir to one of the ports 212, and irrigation tubing from the irrigation channel of the ablation catheter 16 to another one of the ports 212.

The stator 210 is illustrated in FIG. 2B. The stator 210 may be metallic or polymeric. The PCP 200 may be formed from any suitable material or combination of materials. In some exemplary modes of the disclosure, the PCP 200 is formed as a disposable cartridge from plastic, such as molded plastic.

The progressive cavity pump 200 further comprises a rotor 214 (FIGS. 2B and 2C) rotatably disposed within the stator 210 within the housing 204. The cross section in FIG. 2C is shown without frontal section 208 and illustrates the rotor 214 disposed within the stator 210. The rotor 214 may be metallic or polymeric.

One of the ports 212 is connectable to an irrigation reservoir and another one of the ports 212 is connectable to the ablation catheter 16. Thus, rotation of a rotor 214 within the stator 210 causes irrigation fluid to flow from the irrigation reservoir to a distal end of the ablation catheter 16. In FIG. 2C, arrows schematically illustrate the flow of fluid in the PCP 200, between the ports 212 of the PCP 200. It should be noted that if the direction of the rotor 214 is reversed, the irrigation fluid will flow in the opposite direction.

The rotor 214 is configured to rotate in the stator 210 with planetary motion. In order to convert the rotary motion of the motor to the required planetary motion, the progressive cavity pump 200 includes a transmission section 216 disposed in the housing 204. The transmission section 216 is configured to be connected to a drive shaft of the motor and the rotor 214 of the progressive cavity pump 200. The transmission section 216 is configured to translate circular motion provided by the motor to planetary motion to drive planetary motion of the rotor 214 in the stator 210. In some exemplary modes of the present disclosure the transmission section 216 comprises a pair of universal joints such as an Oldham coupling, and the transmission section 216 is disposed between the rotor 214 and a connector 218. The connector 218 has a non-circular external section that is typically female. In the illustrated example, the external section of the connector 218 comprises a trough 220 (FIG. 2A), and the shaft of the motor is configured to connect to the trough 220.

In order to prevent fluid leakage from the PCP 200 during the flow, the PCP 200 comprises a sealing assembly 222. The assembly 222 maintains the integrity of the PCP 200 by only allowing fluid to transfer between the ports 212 of the PCP 200. Assembly 222 is shown in an assembled state in FIG. 2C and the upper part of FIG. 2B, and elements of assembly 222 are shown in an exploded state in the lower part of FIG. 2B.

Assembly 222 comprises an outer retaining sleeve 224 having an aperture 226 configured to retain rotor 214, while having a diameter that is larger than the diameter of the rotor 214. Thus, as illustrated in FIG. 2C, there is a gap between the aperture 226 of the outer retaining sleeve 224 and rotor 214. Outer retaining sleeve 224 encloses an elastic diaphragm 228 that may have a conical shape, the diaphragm 228 terminating at a proximal end of the diaphragm in a first opening 230, and at a distal end of the diaphragm in a second opening 232, larger than the first opening 230.

First opening 230 of diaphragm 228 is configured to grip an inner retaining sleeve 234, which in turn retains an elastic O-ring 236. O-ring 236 encircles rotor 214, so that the first opening 230 of the elastic diaphragm 228, using the inner retaining sleeve 234 and the O-ring 236, effectively grips rotor 214.

Second opening 232 of the elastic diaphragm 228 is held in contact with outer retaining sleeve 224 by a ring 238, and the ring 238 is in turn held in contact with an inner surface of housing 204. The ring 238 thus holds the second opening 232 of the diaphragm 228 in proximity to, and substantially fixed with respect to, and in sealing contact with, the stator 210 of progressive cavity pump 200. The contact of second opening 232 of elastic diaphragm 228 with outer retaining sleeve 224 and ring 238 is enhanced, in an example of the present disclosure, by a thickening 240 of second opening 232. Thickening 240 can be of any shape or thickness necessary to maintain contact with outer retaining sleeve 224 and ring 238.

As is apparent from inspection of FIG. 2C, in a region between the distal side of elastic diaphragm 228 and a proximal end of stator 210, fluid is present during operation of progressive cavity pump 200. However, the elastic properties of the diaphragm 228 and the O-ring 236, together with the arrangement of these elements within sealing assembly 222, ensure that no fluid leaks from the assembly 222.

Furthermore, the space between the proximal side of diaphragm 228 and an inner surface of outer retaining sleeve 224, as well as the larger diameter of aperture 226 compared with the diameter of rotor 214, permit the planetary motion of the rotor 214 that is required during operation of the PCP 200.

Progressive cavity pumps, such as the PCP 200 of FIGS. 2A-C, operate by moving discrete volumes of fluid, within respective cavities, through the pump 200. The discrete nature of the flow means that there is inherently pulsation of the flow, so that there is an oscillation of the pressure. In examples of the present disclosure, the elastic nature of elastic diaphragm 228 acts to dampen the oscillations of the pressure.

Reference is now made to FIG. 3 is a block diagram view of an irrigation sub-system 300 in the system 10 of FIG. 1. The irrigation sub-system 300 includes a controller 302, a motor 304, an irrigation reservoir 306, the progressive cavity pump 200 (which includes the transmission section 216), the catheter 16 which may include a temperature sensor 308.

One of the ports 212 of the progressive cavity pump 200 is configured to be connected to the irrigation reservoir 306, for example, via tubing 310. The other port 212 of the progressive cavity pump 200 is configured to be connected to the proximal end of an irrigation channel 312 of the catheter 16, for example, via tubing 314. The catheter 16 includes at least one irrigation hole 316. The irrigation channel 312 has a distal end connected to the irrigation hole(s) 316.

The motor 304 includes a drive shaft 318 which is configured to be connected to the transmission section 216 of the progressive cavity pump 200 (for example, via the connector 218 (FIGS. 2A-C)). The motor 304 is configured to drive rotation of the rotor 214 of the progressive cavity pump 200. In some exemplary modes, the motor 304 is a servomotor.

The controller 302 is configured to control a rotary speed of the motor 304 to control the flow rate of the progressive cavity pump 200 so as to pump irrigation fluid from the irrigation reservoir 306 into the irrigation channel 312 and out of the irrigation hole(s) 316 of the ablation catheter 16. The controller 302 controls the flow rate based on a known relationship between the rotational rate of the rotor 214 and the flow rate provided by the progressive cavity pump 200. The controller 302 may receive commands 320 from the workstation 42 or patient interface unit 40 setting the flow rate to a given value requested by the physician 12.

The progressive cavity pump 200 is configured to provide a continuous and smooth flow of the irrigation fluid from the irrigation reservoir 306 into the irrigation channel 312 over a period of time (e.g., over the time period taken to perform one ablation). In some exemplary modes, the period of time is in a range of 1 to 10 minutes or more. It should be noted that any suitable flow rate may be provided by the progressive cavity pump 200. However, in some exemplary modes, the progressive cavity pump 200 is configured to provide the continuous smooth flow of the irrigation fluid from the irrigation reservoir 306 into the irrigation channel 312 over the period of time at a flow rate of between 1 to 2 milliliters per minute. In some exemplary modes, the controller 302 is configured to control the rotary speed of the motor 304 to control the flow rate of the progressive cavity pump 200 based on a temperature sensed by the temperature sensor 308 of the ablation catheter 16 so as to keep the temperature at a target temperature. The controller 302 may increase the flow rate as the temperature increases and vice-versa.

In practice, some or all of the functions of the controller 302 may be combined in a single physical component or, alternatively, implemented using multiple physical components. These physical components may comprise hard-wired or programmable devices, or a combination of the two. In some examples, at least some of the functions of the controller 302 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Examples

Example 1: A system comprising: a progressive cavity pump comprising: a housing; a rotor; a stator; and a pair of ports, one of the ports being configured to be connected to an irrigation reservoir, the rotor being disposed in the stator within the housing; an ablation catheter comprising: at least one ablation electrode; at least one irrigation hole; and an irrigation channel having a distal end connected to the at least one irrigation hole, and a proximal end configured to be connected to another one of the ports of the progressive cavity pump; a motor comprising a drive shaft which is configured to be connected to the progressive cavity pump, and drive rotation of, the rotor of the progressive cavity pump; and a controller configured to control a rotatory speed of the motor to control a flow rate of the progressive cavity pump so as to pump irrigation fluid from the irrigation reservoir into the irrigation channel and out of the at least one irrigation hole of the ablation catheter.

Example 2: The system according to example 1, wherein the rotor is configured to rotate in the stator with planetary motion.

Example 3: The system according to example 1, or example 2, further comprising a transmission section configured to be connected to the drive shaft of the motor and the rotor of the progressive cavity pump, and configured to translate circular motion provided by the motor to planetary motion to drive planetary motion of the rotor in the stator.

Example 4: The system according to example 3, wherein the transmission section is disposed in the housing.

Example 5: The system according to any of examples 1-4, wherein the progressive cavity pump is formed as a disposable cartridge.

Example 6: The system according to any of examples 1-4, wherein the progressive cavity pump is formed as a disposable cartridge from plastic.

Example 7: The system according to any of examples 1-4, wherein the progressive cavity pump is formed as a disposable cartridge from molded plastic.

Example 8: The system according to any of examples 1-7, wherein the motor is a servomotor.

Example 9: The system according to any of examples 1-8, wherein the housing includes two ends, wherein the ports are disposed on a same one of the ends of the housing.

Example 10: The system according to any of examples 1-9, wherein the progressive cavity pump is configured to provide a continuous smooth flow of the irrigation fluid from the irrigation reservoir into the irrigation channel over a period of time.

Example 11: The system according to example 10, wherein the progressive cavity pump is configured to provide the continuous smooth flow of the irrigation fluid from the irrigation reservoir into the irrigation channel over the period of time at a flow rate of between 1 to 2 milliliters per minute.

Example 12: The system according to example 11, wherein the period of time is a range of 1 to 10 minutes.

Example 13: The system according to example 10, wherein the period of time is a range of 1 to 10 minutes.

Example 14: The system according to any of examples 1-13, wherein the controller is configured to control the rotatory speed of the motor to control the flow rate of the progressive cavity pump based on a temperature sensed by the ablation catheter.

Various features of the disclosure which are, for clarity, described in the contexts of separate exemplary modes may also be provided in combination in a single exemplary mode. Conversely, various features of the disclosure which are, for brevity, described in the context of a single exemplary mode may also be provided separately or in any suitable sub-combination.

The exemplary modes described above are cited by way of example, and the present disclosure is not limited by what has been particularly shown and described hereinabove. Rather the scope of the disclosure includes both combinations and sub-combinations of the various features described hereinabove, as well as variations and modifications thereof which would occur to persons skilled in the art upon reading the foregoing description and which are not disclosed in the prior art.

What is claimed is:

1. A system comprising:
a progressive cavity pump comprising: a housing; a rotor; a stator; and a pair of ports, one of the ports being configured to be connected to an irrigation reservoir, the rotor being disposed in the stator within the housing;
an ablation catheter configured for ablating cardiac tissue the catheter comprising: at least one ablation electrode; at least one irrigation hole; and an irrigation channel having a distal end connected to the at least one irrigation hole, and a proximal end configured to be connected to another one of the ports of the progressive cavity pump;
a motor comprising a drive shaft which is configured to be connected to the progressive cavity pump, and drive rotation of, the rotor of the progressive cavity pump; and
a controller configured to control a rotatory speed of the motor to maintain a steady flow rate of the progressive cavity pump so as to pump irrigation fluid from the irrigation reservoir into the irrigation channel and out of the at least one irrigation hole of the ablation catheter at a steady flow rate to provide a continuous smooth flow of the irrigation fluid into the irrigation channel over a period of time.

2. The system according to claim 1, wherein the rotor is configured to rotate in the stator with planetary motion.

3. The system according to claim 2, further comprising a transmission section configured to be connected to the drive shaft of the motor and the rotor of the progressive cavity pump, and configured to translate circular motion provided by the motor to planetary motion to drive planetary motion of the rotor in the stator.

4. The system according to claim 3, wherein the transmission section is disposed in the housing.

5. The system according to claim 1, wherein the progressive cavity pump is formed as a disposable cartridge.

6. The system according to claim 1, wherein the progressive cavity pump is formed as a disposable cartridge from plastic.

7. The system according to claim 1, wherein the progressive cavity pump is formed as a disposable cartridge from molded plastic.

8. The system according to claim 1, wherein the motor is a servomotor.

9. The system according to claim 1, wherein the housing includes two ends, wherein the ports are disposed on a same one of the ends of the housing.

10. The system according to claim 1, wherein the progressive cavity pump is configured to provide the continuous smooth flow of the irrigation fluid from the irrigation reservoir into the irrigation channel over the period of time at a flow rate of between 1 to 2 milliliters per minute.

11. The system according to claim 10, wherein the period of time is a range of 1 to 10 minutes.

12. The system according to claim 1, wherein the period of time is a range of 1 to 10 minutes.

13. The system according to claim 1, wherein the controller is configured to control the rotatory speed of the motor to control the flow rate of the progressive cavity pump based on a temperature sensed by the ablation catheter.

* * * * *